United States Patent [19]

Yngvesson

[11] Patent Number: 5,636,506

[45] Date of Patent: Jun. 10, 1997

[54] CHAIN LINK

[76] Inventor: Stig-Rune Yngvesson, Box 147, S-430 92 Fotö, Sweden

[21] Appl. No.: 446,658

[22] PCT Filed: Nov. 26, 1993

[86] PCT No.: PCT/SE93/01022

§ 371 Date: May 3, 1996

§ 102(e) Date: May 3, 1996

[87] PCT Pub. No.: WO94/12807

PCT Pub. Date: Jun. 9, 1994

[30] Foreign Application Priority Data

Nov. 27, 1992 [SE] Sweden ................. 9203572

[51] Int. Cl.$^6$ ................................. F16G 13/16
[52] U.S. Cl. ................................. 59/80; 59/85
[58] Field of Search ................. 59/78, 80, 85

[56] References Cited

U.S. PATENT DOCUMENTS

| 6,238 | 3/1849 | Walkington | 59/78 |
|---|---|---|---|
| 1,257,398 | 2/1918 | Roach. | |
| 1,372,693 | 3/1921 | Hodges. | |
| 1,439,978 | 12/1922 | Renault | 59/80 |
| 2,714,798 | 8/1955 | Linnenbank. | |
| 2,840,983 | 7/1958 | Keilbach. | |
| 3,673,794 | 7/1972 | I'Anson. | |
| 4,056,928 | 11/1977 | de Vries. | |

FOREIGN PATENT DOCUMENTS

| 0063533 | 10/1982 | European Pat. Off.. | |
|---|---|---|---|
| 328718 | 11/1920 | Germany. | |
| 330604 | 12/1920 | Germany. | |
| 248508 | 4/1926 | Italy | 59/80 |

Primary Examiner—David Jones
Attorney, Agent, or Firm—Samuels, Gauthier, Stevens & Reppert

[57] ABSTRACT

The invention relates to a chain link and a method for the production thereof as well as a chain consisting of connected chain links and a connecting part for connecting chain links. The chain link consists of an endless elongated rod-like part (1) which is characterized in that it is shaped as two pairs of loops (2, 3) and (4, 5) wherein the loops in each pair are substantially parallel and the pairs are arranged in two planes which are turned through 90° with respect to each other. The connecting part consists of a semi-finished chain link and the chain consists of connected chain links as well as possibly connecting parts.

4 Claims, 2 Drawing Sheets

CHAIN LINK

BACKGROUND OF THE INVENTION

The present invention relates to a chain link and a method for the production thereof and comprises chain links made of different materials such as steel and plastics. Chain links according to the present invention can be used in an unlimited number of applications.

Chains are commonly known. They consist of ring- or loop-shaped links usually of steel which have been threaded into each other and thereafter welded together so that they consist of a continuous unit which cannot easily be taken apart. The chain link can also consist of materials other than steel having the desired strength and corrosion resistance depending on the intended field of use.

Chains are used all over in a number of quite different areas. One such area is on boats, for example on fishing boats. There the chains are primarily used for fastening the trawl to a trawl board in the boat. Such a trawl is usually attached at two points on the boat by means of chains which branch out and which by means of straps and the like are connected to the trawl itself at a number of points. In this connection it is important that the different length of the chains can be adapted so that the trawl is connected properly.

When for instance on a fishing boat the length of the chain has to be adjusted to make the trawl function optimally, chain links have to be added or removed, which due to the movements of the boat is very laborious. It may also be necessary to replace chain links due to wear. The work is usually done on deck by means of a cutting torch or other types of cutting tools which opens the chain link so that replacement and adjustment can be carried out. During this work no fishing can be done and all work has to be done under stress which can result many cut and burn injuries.

SUMMARY OF THE INVENTION

There has therefore always been a strong desire to be able to adjust the length of a chain in a simpler way than that described above without the help of cutting or other tools. According to the invention a chain link has therefore been produced consisting of an endless elongated rod-like part which is characterized in that it has been formed as two pairs of loops, wherein the loops in every pair are substantially parallel, and in that the pairs are arranged in two planes which are turned through 90° with respect to each other.

According to the invention the two pair of loops should have the same dimension.

It is further suitable according to the invention that the parallel loops are located at a certain distance from each other corresponding approximately to the thickness of the rod. They can, however, also lie tight against each other and be welded together.

According to the invention the chain link can be made for example of wrought steel or thermoplastics, preferably ultra-high molecular crystalline polyamide 6.

The invention also comprises a chain consisting of connected chain links according to the claims as well as possibly one or more connecting parts.

A connecting part for connecting the chain links is also comprised in the invention and is characterized in that it consists of a semifinished chain link and is made of an endless elongated rod having two parallel straight portions merging into a loop at each end.

The invention also comprises a method for the production of chain links according to the invention, the method being characterized in that an endless elongated rod having two parallel straight portions merging into a loop at each end is first moulded or extruded whereupon the two straight portions are bent into loops in a plane perpendicular to the plane of the moulded loops.

According to the invention it is suitable that the material in the rod consists of crystalline ultra-high molecular thermoplastics and that the bending is carried out during, at most, 5–10 seconds after the first shaping whilst the rod still is hot, for example 60° C.

BRIEF DESCRIPTION OF THE DRAWINGS

The invention will now be described in more detail with reference to the drawings, in which.

DETAILED DESCRIPTION OF THE ILLUSTRATED EMBODIMENT

Figure 1:
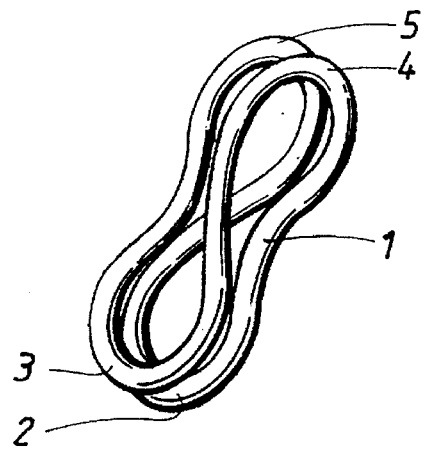
FIG. 1 shows a chain link according to the invention in perspective.

In FIG. 1 a chain link according to the invention is shown in perspective. It consists of an endless elongated rod 1 which has been bent so that it includes two pairs of loops 2, 3 and 4, 5. The loops of each pair of loops 2, 3 and 4, 5 are located at some distance from each other, suitably at approximately the same distance as the thickness of the rod 1. The loop pairs 2, 3 and 4, 5 have approximately the same dimensions and they are turned through 90° with respect to each other.

Figure 2:
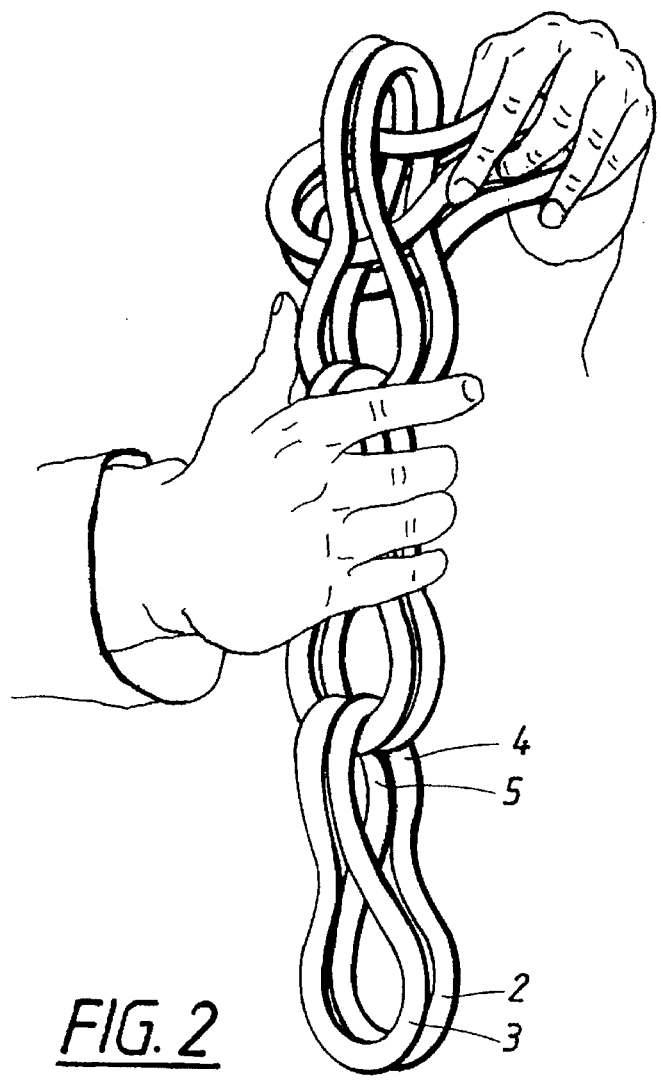
FIG. 2 shows a chain consisting of three links and where the fourth link being mounted.

The chain links according to the invention can be threaded into each other as shown in FIG. 2. This occurs in a simple way by using the distance between the two loops in a pair of loops and threading this pair of loops in around the rods in a pair of loops in another chain link. The new chain link is inserted completely and the first inserted pair of loops in this chain link will then be accessible for connection to a further chain link and so on. In this way it is possible to quickly couple together a great number of chain links. The outermost link at every end has a free pair of loops which can be used for attaching the link to a suitable location. The chain can as is apparent, be put together in a very simple way but it stays together and can not be taken apart without starting with the chain link which is located outermost. The chain link can also be constructed so that it fits in a usual chain eye.

Figure 3:
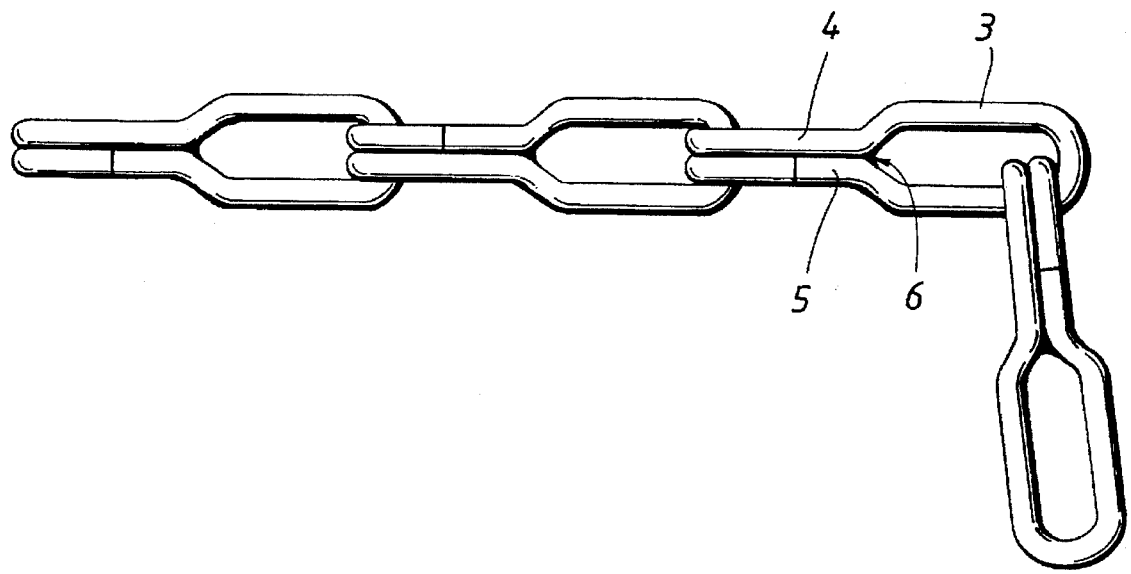
FIG. 3 shows a second embodiment of the chain link and FIG. 4 shows a connecting part according to the invention.

FIG. 3 shows another embodiment of the chain according to the present invention. In this embodiment the pair of loops 4, 5 and 2, 3 lie tightly against each other. It is then not possible to insert the chain links into each other if they are not made of such an elastic material that the loop pairs can be sprung apart during assembly. After assembly the pair of loops can be welded together to each other at suitable such as for example indicated at 6. In this case a chain which is much stronger than a chain according to the first embodiment and conventional chains is produced. The loops in this embodiment which can be called a security chain are suitably made oblong so that any deformation of them by strong tension in the chain will not occur. In this chain link having double pair of loops, only one weld for connection of the rod ends to each other is present. This means that only one in four rod parts which cooperates under the tension has a weld which makes an enormous improvement since the chain links normally break at the weld.

Figure 4:
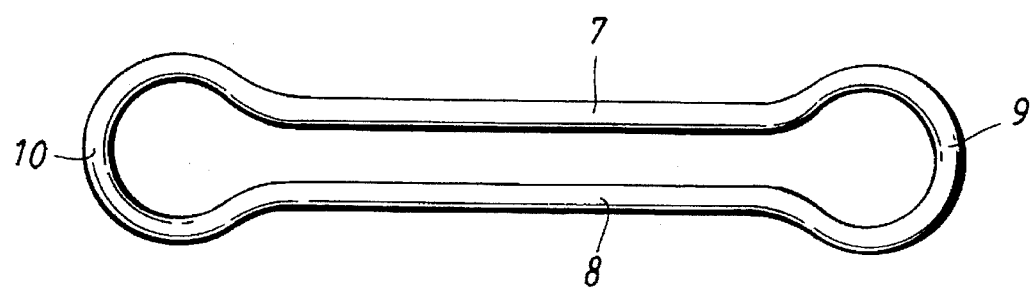

The invention also comprises a semi-finished chain link which is shown in FIG. 4 and can be used as a connection part between two chain links. This connection part is shown in FIG. 4 and comprises two parallel straight portions 7 and 8 which at each end merge into the loops 9 and 10. This endless connecting part can, by means of the loops 9 and 10, be connected to the pair of loops 2, 3 and 4, 5 in the chain links. The loops 9 and 10 suitably have the same dimensions as the loops 2, 3 and 4, 5 in the chain links. The loops 9 and 10 shown in FIG. 4 should form a pair of loops if the straight portions 7 and 8 are bent for forming a further pair of loops. The advantage of using such a connecting part is that it becomes at least twice as long as the chain link which can be advantageous in certain applications. The connection part can of course, if desired, be made much longer which however makes it necessary to provide a special tool for this part.

The chain link according to the present invention can consist of any suitable material, preferably however of wrought steel or thermoplastics. The thermoplastics must, however, have very specific properties and it must consist of a crystalline plastics having low viscosity and high molecular chains. Such a material is polyamide 6.

For the production of such a chain link according to the invention an endless elongated thread having two parallel straight portion which merge into a loop at each end is first produced by extrusion in a tool or by some kind of a moulding process. The temperature during the extruding or moulding is dependent on the polymer used. After forming the still hot rod link is bent in a special bending fixture where the two straight portions are bent parallel and simultaneously so that they will be transformed into the second pair of loops. It is very important that the bending occurs quickly from the time where the rod link is removed from the first forming tool, preferably 5–10 seconds after the removal whilst the rod still has a temperature of approximately 60° C. The bending procedure is carried out until the preformed loops in the first step are lying tight against each other and the finished chain link is allowed to remain in the bending tool until it has cooled down which takes about 5 minutes. After removal from the tool the compressed pair of loops depart somewhat from each other so that the final desired form is obtained.

The chain link can also be manufactured directly in a tool without resultant bending. The tool will then be more complicated but the elasticity of the plastics allows removal of the chain link from the tool anyway.

If other materials than thermoplastics are used in the chain link, some other method of production may be advantageous but a steel chain link can also be produced in the same way as a link made of plastics according to the above, but then with other temperature and pressure conditions.

By the present invention a chain link, a chain, a connecting part and a method for the production of these parts is obtained which gives a cheap, very simple and strong as well as suitable chain. It can advantageously be used for example on fishing boats whereby for example the working time for replacement, lengthening or shortening of chains can be reduced by about 90%, obtaining at the same time a minimal risk of accidents.

Due to the possibility of quickly being able to lengthen or shorten the chain, the possibility of using it in a great number of applications is also obtained. It can for example be used for road blocks by simply extending the chain if the road is too broad for a certain chain, or a pair of completed chains can be coupled together by means of the connecting part. The chain is also strong in that it is double, along the whole length if the connecting part is not used.

If an extremely strong chain is desired it is possible to use the embodiment having lying pairs of loops lying tight against each other which gives a chain which is almost twice as strong as a corresponding conventional chain made of the same material.

The invention is not limited to the shown embodiments but can be varied in different ways within the scope of the claims.

What is claimed is:

1. A chain link consisting of continuous elongated rod-like part having a specified cross-sectional diameter and which is formed as two pairs of loops, wherein the loops in each pair are substantially parallel and spaced from one another by a distance corresponding approximately to the diameter of the rod-like part, said two pairs of loops being unalterably configured in two planes which are orthogonal with respect to each other, the two pairs of loops having the same dimension, whereby said chain link is coupled to and uncoupled from a chain of similar links without the use of a tool or altering the configuration of said chain link.

2. The chain link according to claim 1, wherein said chain link is made of wrought steel or thermoplastics, preferably high molecular crystalline polyamide having a low viscosity.

3. The chain link of claim 1, wherein each of the two pairs of loops are arranged to receive at least one of two pairs of loops associated with a similarly configured chain link.

4. A chain having a plurality of chain links, each chain link consisting of an endless elongated rod-like part having a specified cross-sectional diameter and which is formed as two pairs of loops, wherein the loops in each pair are substantially parallel and spaced from one another by a distance corresponding approximately to the diameter of the rod-like part, said two pairs of loops being unalterably configured in two planes which are orthogonal with respect to each other, the two pair of loops having the same dimension, whereby said chain link is connectable to and disconnectable from a chain of similar links without the use of a tool or altering the configuration of said chain link and in a manner in which each of the two pairs of loops of each link is arranged to receive at least one of two pairs of loops associated with a similarly configured chain link.

* * * * *